(12) United States Patent
Wagner et al.

(10) Patent No.: US 8,885,306 B2
(45) Date of Patent: Nov. 11, 2014

(54) POWER MANAGEMENT AND DISTRIBUTION SYSTEM HAVING A FAULT DETECTION AND ISOLATION ASSEMBLY AND METHOD

(75) Inventors: Carl A. Wagner, Beloit, WI (US); Michael Krenz, Roscoe, IL (US); Jeffrey T. Wavering, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 267 days.

(21) Appl. No.: 13/448,554

(22) Filed: Apr. 17, 2012

(65) Prior Publication Data

US 2013/0271884 A1    Oct. 17, 2013

(51) Int. Cl.
    H02H 3/38    (2006.01)
(52) U.S. Cl.
    USPC .......................................................... 361/65
(58) Field of Classification Search
    USPC .......................................................... 361/65
    See application file for complete search history.

(56) References Cited

U.S. PATENT DOCUMENTS

2003/0067725 A1 * 4/2003 Horvath et al. ................. 361/65
2003/0223167 A1 * 12/2003 Udren ............................. 361/65
2011/0285202 A1 * 11/2011 Rozman et al. ................. 307/23

* cited by examiner

Primary Examiner — Jared Fureman
Assistant Examiner — Kevin J Comber
(74) Attorney, Agent, or Firm — Cantor Colburn LLP

(57) ABSTRACT

A power management and distribution system includes a source block having a power distribution line, wherein the power distribution line includes a distribution switch. At least one load block is in operable communication with the power distribution line and having a plurality of load block power output lines, wherein each of the plurality of load block power output lines includes a load switch. Further included is a plurality of loads each carried power by at least one of the plurality of load block power output lines. Yet further included is a protection logic unit comprising at least one algorithm for comparing a power characteristic to a power characteristic threshold at a plurality of locations, wherein the protection logic unit selectively determines which of the source block switches, distribution switches and the load switches of the plurality of load block power output lines are opened based on at least one comparison.

11 Claims, 4 Drawing Sheets

POWER MANAGEMENT AND DISTRIBUTION SYSTEM HAVING A FAULT DETECTION AND ISOLATION ASSEMBLY AND METHOD

BACKGROUND OF THE INVENTION

The present invention relates to power management and distribution systems, and more particularly to such systems having fault detection and isolation assemblies, as well as methods directed toward fault detection and isolation for such systems.

In typical electrical power generation and distribution systems, the measurement of currents on power wiring and protection of the wiring, as well as connected equipment, is needed in the event of failure. An aircraft is one illustrative example of an application for such systems. For aircraft systems, electrical energy is essential for continued flight when relying on electrical flight controls, and is also flight critical for electrically driven hydraulic pumps. Aircraft power systems may use a variety of power characteristics including AC (Alternating Current) or DC (Direct current) systems. Further typical variations of power types may include power sources, loads and distribution of nominal voltages including, but not limited to 28 Vdc, 270 Vdc, or 540 Vdc and 26 Vac, 115 Vac, and 230 Vac. The AC system types may also include Constant Frequency (CF), or Variable Frequency (VF) systems with a wide variation in output current and power ratings. Severe wiring or internal faults within these systems and within power distribution equipment panels or wiring may cause loss of power to these flight critical systems. Protective functions and assemblies within the power distribution systems improve flight safety by preventing or minimizing the effect of system or wiring faults. Rapid detection and isolation, as well as segregation, of short circuit faults are desirable due to the localized heating and damage that high current or arcs may cause.

Arcing type faults can be difficult to distinguish from normal non-linear or pulsed type load effects. Typical power systems have relied on current sensors at multiple locations on each wire segment and dedicated controllers and protection functions for each wire. These methods are large, heavy and expensive, have high power losses, or have other undesirable features.

BRIEF DESCRIPTION OF THE INVENTION

According to one embodiment, an AC or DC power management and distribution system having a fault detection and isolation assembly includes at least one source block having a power distribution line, wherein the power distribution line includes a distribution switch. For applications using AC power, each of the switches, buses and sources, etc., may represent either single phase or 3 phase circuits. Also included is at least one load block in operable communication with the power distribution line and having a plurality of load block power output lines, wherein each of the plurality of load block power output lines includes a load switch. Further included is a plurality of loads each carried power by at least one of the plurality of load block power output lines. Yet further included is a protection logic unit comprising at least one algorithm for comparing a power characteristic to a power characteristic threshold at a plurality of locations, wherein the protection logic unit selectively determines which of the distribution switch and the load switches of the plurality of load block power output lines are opened based on at least one comparison.

According to another embodiment, a power management and distribution system having a fault detection and isolation assembly includes at least one source block having a plurality of power distribution lines, wherein each of the plurality of power distribution lines includes a distribution switch and a source switch. Also included is a plurality of load blocks, each of the plurality of load blocks in operable communication with at least one of the plurality of power distribution lines and having a plurality of load block power output lines, wherein each of the plurality of load block power output lines includes a load switch. Further included is a plurality of loads carried power by at least one of the plurality of load block power output lines. Yet further included is a protection logic unit comprising at least one algorithm for comparing a power characteristic to a power characteristic threshold at a plurality of locations, wherein the protection logic unit selectively determines which of the distribution switches and the load switches are opened.

According to yet another embodiment, a method of fault detection and isolation for a power management and distribution system is provided. The method includes carrying power from a power source through at least one source switch to at least one source block. Also included is carrying power from the at least one source block directly to a load block. Further included is carrying power from the at least one load block through at least one load switch to a load. Yet further included is measuring a power characteristic at a plurality of locations along a power path and calculating a power characteristic difference between at least two of the plurality of locations. Also included is comparing the power characteristic difference to a power characteristic threshold. Further included is opening at least one of the at least one source switch, the at least one distribution switch and the at least one load switch if the power characteristic difference exceeds the power characteristic threshold.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
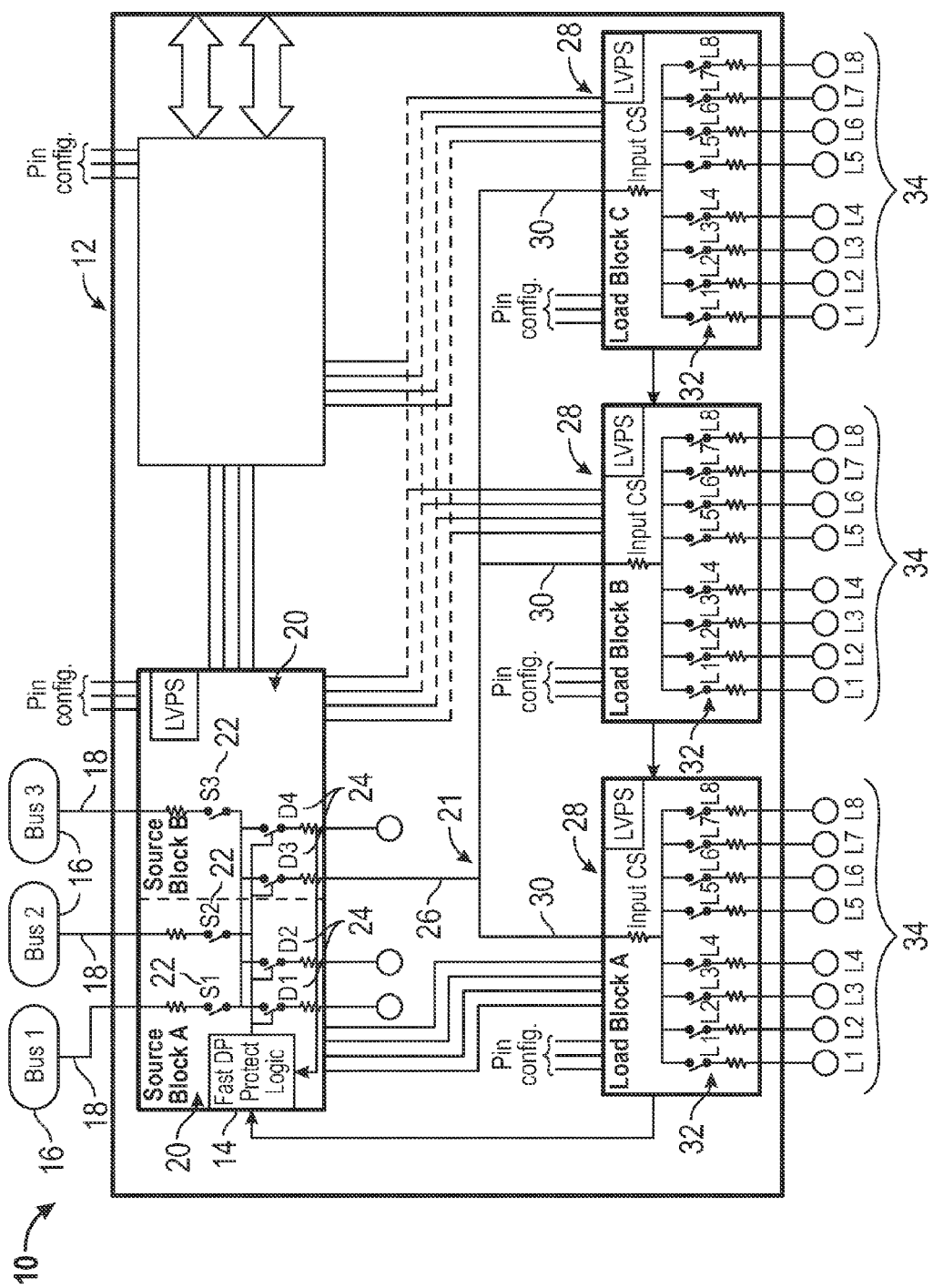
FIG. 1 is a schematic illustration of a power management and distribution system having at least one source block and at least one load block according to a first embodiment.

Referring to FIG. 1, a first embodiment of a power management and distribution ("PMAD") system is schematically illustrated and identified with the reference numeral 10. In one embodiment, the PMAD system 10 is configured to detect and isolate faults. The PMAD system 10 may be incorporated into a variety of applications, including vehicles, with one example of such a vehicle being an aircraft. The PMAD system 10 includes a power block 12. The term "power block" conceptually refers to hardware structure that functionally monitors and protects at least one load, but typically a plurality of load circuits. Nominally, this may include solid state power controllers (SSPCs), control logic, processing logic, internal communications busses, and power supplies to power various control elements. It may also include the devices necessary to convert the power from what is available at the input to the power block 12 to what the various loads require (e.g. AC to DC conversion). The power block 12 also includes at least one protection logic unit 14 that comprises algorithms used to provide for identification and isolation of failures, such that a minimum of user equipment is affected.

As shown in the illustrated embodiment, the power block 12 includes at least one, but typically a plurality of, power source supplies 16 that provide at least one source block input line 18 to at least one source block 20, beginning what will be referred to as a power path 21. AC system types may include Constant Frequency (CF), or Variable Frequency (VF) systems with a wide variation in output current and power ratings. At least one source switch 22 is disposed in operable communication with each source block input line 18. The power path 21 continues to at least one, but typically a plurality of, distribution switches 24 that each are in operable communication with a source block power output line 26 that carries power to at least one load block 28, with the power path 21 splitting in the event a plurality of load blocks 28 are provided power through distribution switch 24. A load block input line 30 continues the power path 21 to at least one, but typically a plurality of, load switches 32 that are each in operable connection with load zone 34 that is ultimately powered by the load path 21. The loads 34 may take on a variety of forms, and in an application related to an aircraft, the loads 34 may include, but is not limited to, flight control systems. A typical load block 28, for example, load block A per FIG. 1 provides for separate and unique load utilization equipment L1-L8, with each corresponding L1-L8 switch being separately controllable. Similarly, load block B may have separately controllable switch elements L1-L8 providing power to other unique load utilization equipment L1-L8.

The aforementioned protection logic unit 14 is configured to receive a variety of data from numerous components of the PMAD system 10, with one example of such components relating to power characteristics at a plurality of locations throughout the PMAD system 10, and more particularly within the power block 12. The power characteristics include common characteristics, such as current and voltage, for example, but it is to be appreciated that numerous other characteristics may be monitored and communicated to the protection logic unit 14, either explicitly or inherently. The plurality of locations referenced above may include several locations along the power path 21, such as the source block input line 18, between the source switch 22 and the distribution switch 24, between the distribution switch 24 and the load block input line 30 and the at least one load switch 32, and between the at least one load switch 32 and the loads 34. These locations are merely illustrative and it is to be understood that numerous other locations within the PMAD system 10 may be monitored, depending on the application configuration.

Monitoring a power characteristic, such as current, at the plurality of locations provides the protection logic unit 14 to determine a plurality of current differences along the power path 21, which may be used to determine if a significant current loss is occurring at critical locations. The calculated current differences may be compared to a power characteristic threshold that is predetermined to account for typical errors in the monitoring devices, such as current sensors. This reduces the likelihood that a false fault detection and isolation occurs (i.e., one or more of the load switches 32 is opened) in the PMAD system 10. Additionally, the current difference may be monitored over a specified time period to ensure that non-ideal behaviors such as sensor saturation, current sub-transient effects, sensor signal sampling or communications time skewing induced errors do not cause improper fault detection and isolation. Such a time period is typically less than or equal to about 20 milliseconds (ms). An algorithm representing the fault detection scheme described above is generally as follows:

$$\text{Fault} = \{(\text{Current } A - \text{Current } B) > (1 + 0.08) * \text{Normal Rated Current}\}$$

The preceding algorithm is merely exemplary and may be modified with respect to the allowable error of 8% that is shown above. Current A and Current B are illustrative currents measured at the plurality of locations described above. In the case where the current difference exceeds the power characteristic threshold, at least one switch is opened, thereby cutting off the supply of power to one or more components or loads.

The PMAD system 10 is configured to calculate a plurality of current differences and the provision of such data to one or more logic units, including the protection logic unit 14, allows the sensing of a fault at a variety of locations. Such monitoring and employment of algorithms identifies a fault at the "lowest level" in the PMAD system 10, with the lowest level referring to a location closest to the loads 34, thereby alleviating the need to trip, or open, a switch excessively far "upstream" in the system, which would unnecessarily result in the loss of power to numerous components that should otherwise be functioning.

Figure 2:
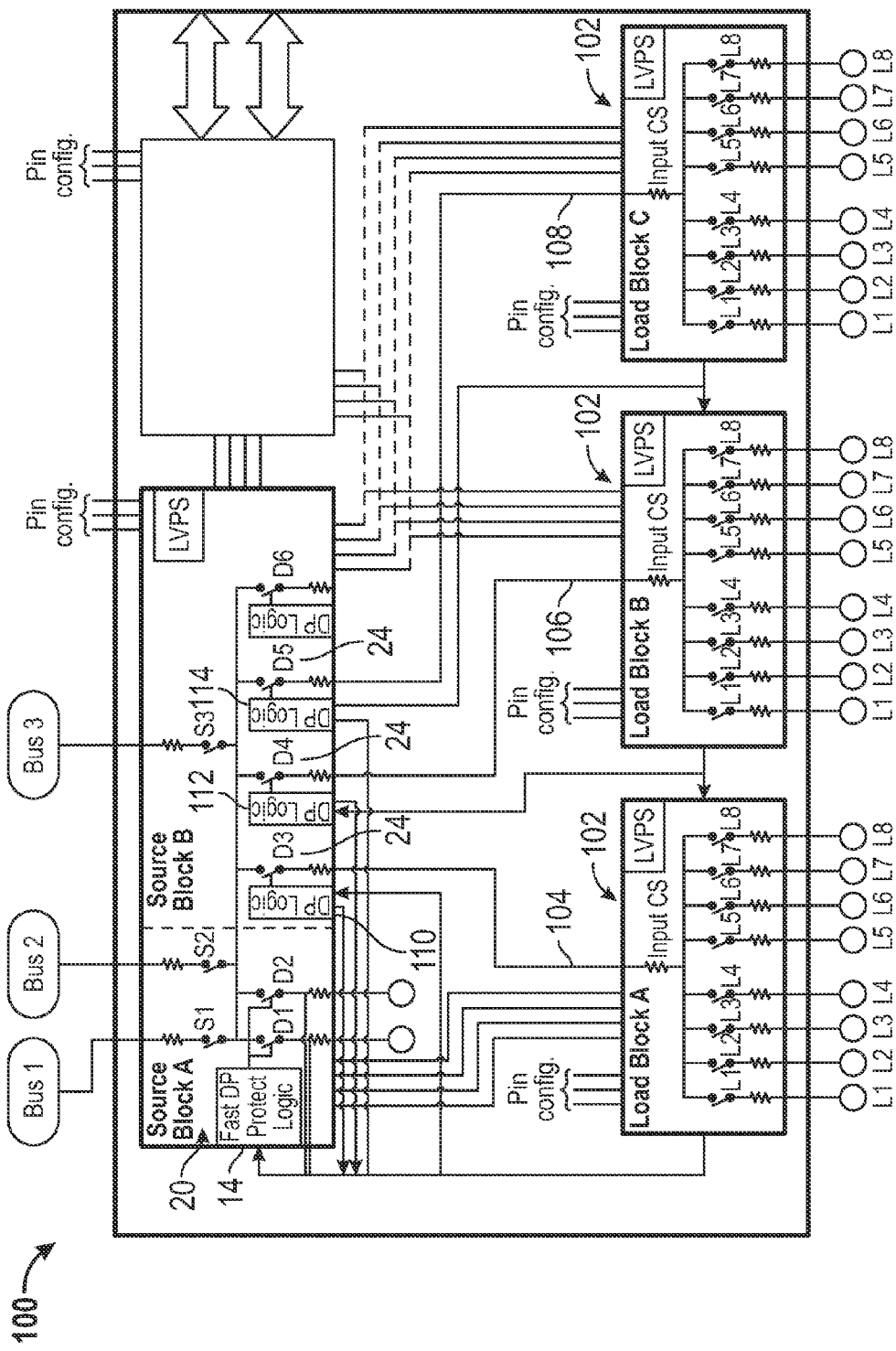
FIG. 2 is a schematic illustration of a power management and distribution system having at least one source block and a plurality of load blocks according to a second embodiment.

Referring to FIG. 2, a second embodiment of the PMAD system 100 is illustrated. PMAD system 100 is similar in construction to PMAD system 10, but as is shown, a plurality of load blocks 102 each include distinct source block power output lines 104, 106, 108 that operably carry power to each of the load blocks 102. Additionally, each of the load blocks 102 communicates power characteristic data to a distribution switch logic unit 110, 112, 114. Each of the distribution switch logic units 110, 112, 114 is in operable communication with the distribution switches 24. The illustrated embodiment of the PMAD system 100 provides for more discrete control in the event a fault is detected. Specifically, based on the individualized source block power output lines 104, 106, 108, a fault detected between the distribution switch 24 and one of the load blocks only requires opening the distribution switch 24 associated with the faulty load block, rather than cutting off power to a plurality of load blocks carried power by the same source block power output line.

Figure 3:
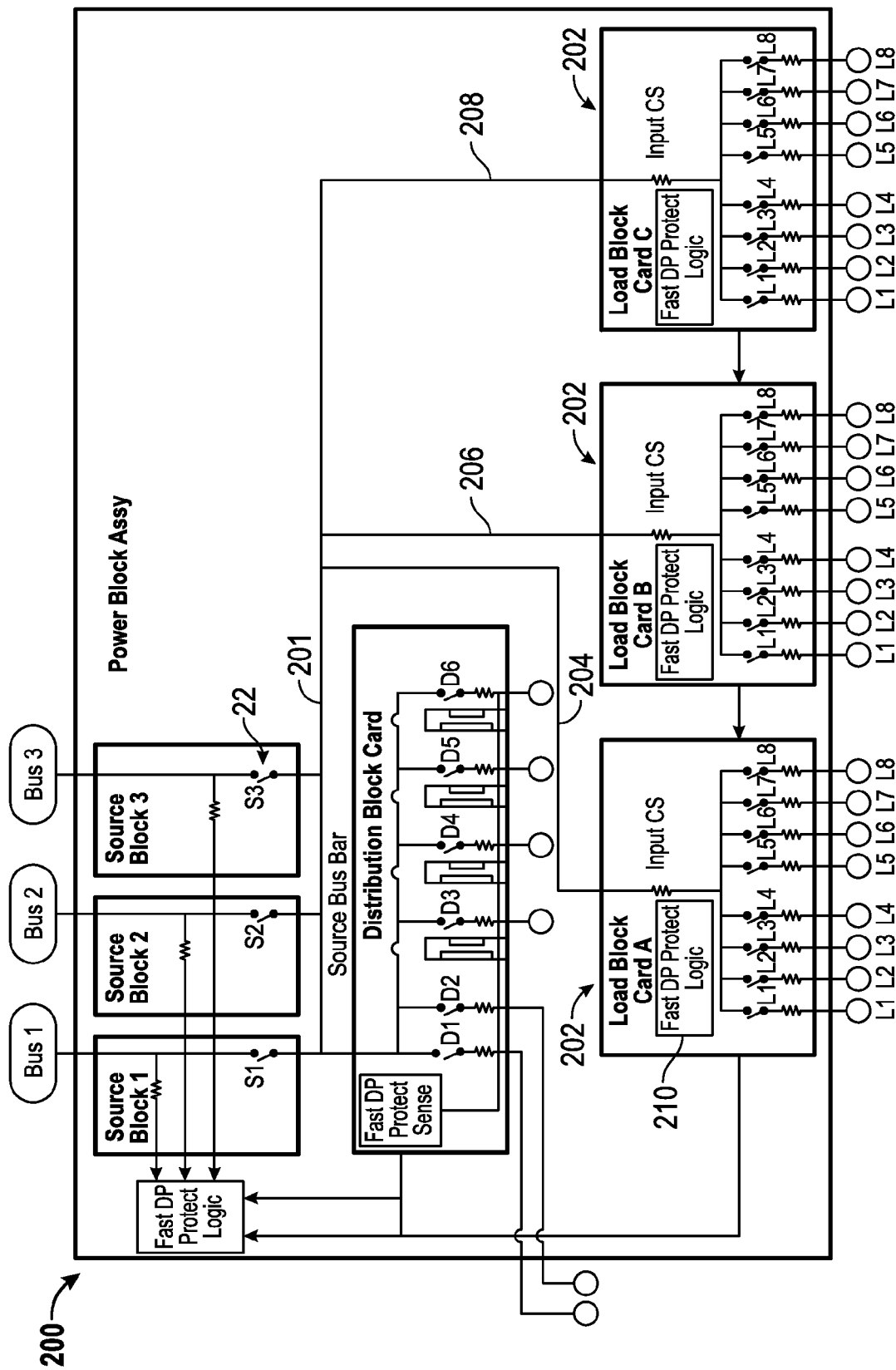
FIG. 3 is a schematic illustration of a power management and distribution system having at least one source block and a plurality of load blocks according to a third embodiment.

Referring to FIG. 3, a third embodiment of the PMAD system 200 is illustrated. The PMAD system 200 is similar in construction to PMAD systems 10 and 100, but as is shown, a plurality of load blocks 202 each include combined source block power output lines 204, 206, 208 that operably carry power to each of the load blocks 202. Additionally, each of the load blocks 202 communicates power characteristic data to a source switch logic unit 210. The source switch logic unit 210 is in operable communication with the source switches 22. The illustrated embodiment of the PMAD system 200 provides for more discrete control in the event a fault is detected. Specifically, based on the individualized source block power output lines 204, 206, 208, a fault detected between the source switch 22 and one of the load blocks requires opening each of the source switches 22 that may be providing power to the combined power present on the source bus bar 201 to a plurality of load blocks carried power by the same source block power output line. This architecture provides greater power density by using all of the distribution block outputs to power external loads rather than internal loads, such as the load block card power inputs shown on FIGS. 1 and 2.

Figure 4:
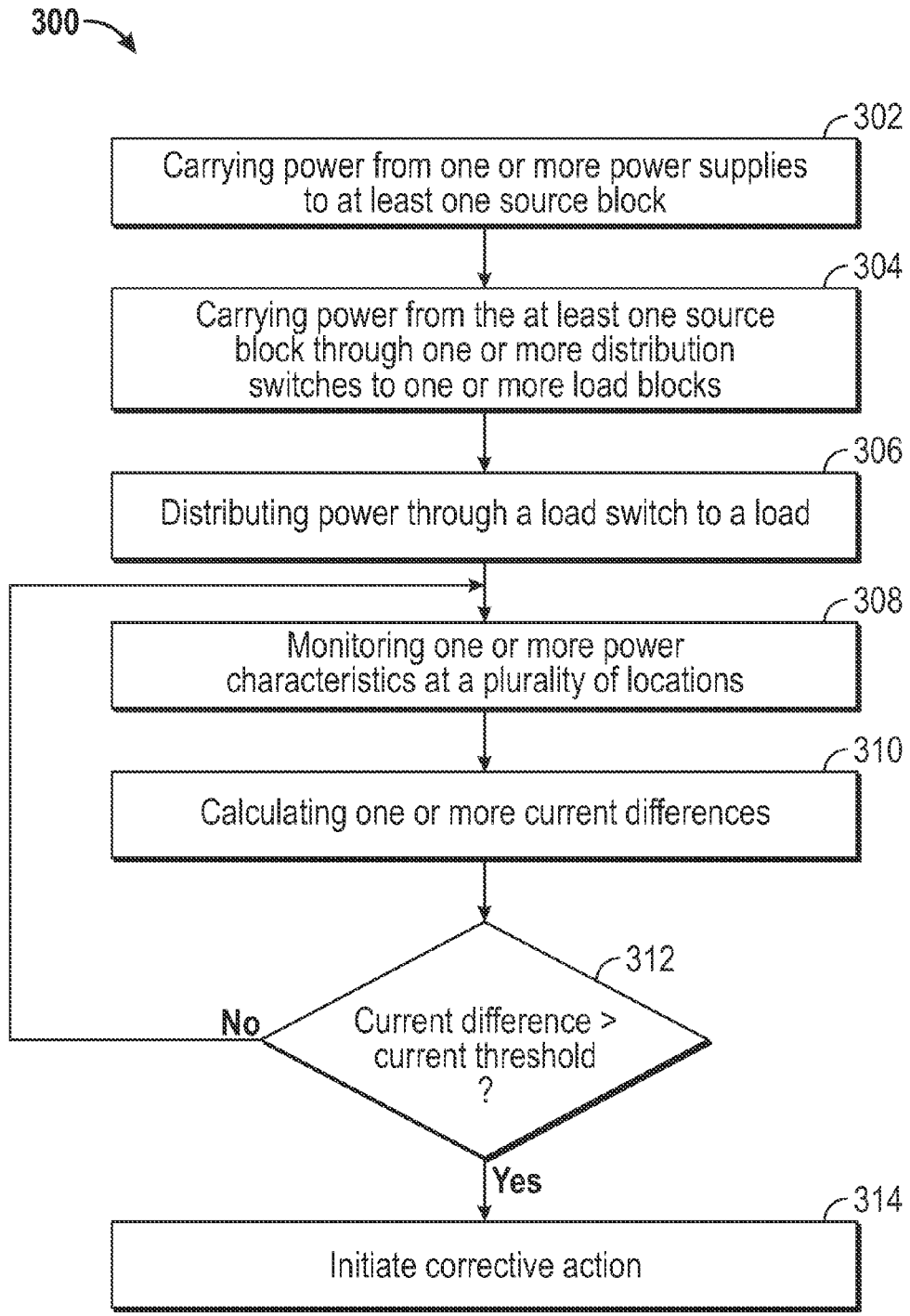
FIG. 4 is a flow diagram according to a method of fault detection and isolation for the power management and distribution system.

Referring now to FIG. 4, a method of fault detection and isolation 300 of the PMAD system 10 is also provided, and the following description is applicable to the second embodiment of the PMAD system 100. The PMAD system 10, and more particularly the fault detection and isolation system of the power block 12 have been previously described and specific structural components need not be described in further detail. The method 300 includes carrying power 302 from one or more power supplies 16, or sources, to the at least one source block 20 through one or more source switches 22 in operable communication with the source block input line 18. The power is then carried further along the power path 21 into what are referred to as "branches," which comprise various levels of components of the PMAD system 10. Power is then carried 304 from the at least one source block 20 through one or more distribution switches 24 to one or more load blocks 28. The power path(s) 21 to the load blocks 28 may take the form of a single path that splits into a plurality of branches from a single distribution switch to a plurality of load blocks, as in the case of the first embodiment shown in FIG. 1. Alternatively, the power paths 21 may be individual lines that distribute power to distinct load blocks 28, as in the case of the second embodiment shown in FIG. 2. Upon reaching the load block, power is distributed 306 through a load switch to a load.

As described above, monitoring of one or more power characteristic 308, such as measurement of current, is conducted at a plurality of locations along the power path. Using the monitored data, one or more current differences may be calculated 310 and compared 312 to a power characteristic threshold, such as a predetermined current threshold. In the event that the current difference exceeds the predetermined current threshold, a fault is identified and corrective action is initiated 314. Based on the location of the identified fault, an appropriate switch is opened in the location determined by one or more protective logic units, which may be located at various locations within the power block, or alternatively at a remote location of the PMAD system. Opening of a switch cuts off power to all branches below that switch. The logic unit(s) employ algorithms that function to open a switch at the lowest appropriate level (i.e., closest to the load), thereby minimally disrupting power operation of other components or branches of the PMAD system.

The resulting effect of the above-described method is that a fault below any load switch results only in removal of the associated load. Faults above any load switch, but below the load block power input line results in a trip of the distribution switch powering the appropriate load block per FIGS. 1 and 2. Similarly, a fault above the distribution switch results in opening of the appropriate source switch per FIGS. 1 and 2. Similarly, for FIG. 3, faults within the assembly above the load block sensor results in opening of the appropriate source switches. Therefore, a layered and segregated protection functionality provides overall failure mode selectivity, isolation and full protection for each segment of the PMAD system, including protection between power blocks, as well as within power blocks.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An AC or DC power management and distribution system having a fault detection and isolation assembly comprising:
    at least one source block having a power distribution line, wherein the power distribution line includes a distribution switch;
    at least one power source supply line for distributing power to the at least one source block, wherein the at least one power source supply line comprises a plurality of source switches;
    at least one load block in operable communication with the power distribution line and having a plurality of load block power input lines and output lines, wherein each of the plurality of load block power output lines includes a load switch;
    a plurality of loads each carried power by at least one of the plurality of load block power output lines; and
    a protection logic unit comprising at least one algorithm for comparing a current differential to a current differential threshold at a plurality of locations, wherein the protection logic unit selectively determines which of the source switches, distribution switches and load switches of the are opened based on at least one comparison, wherein the plurality of locations comprises the source block input line, between the source switch and the distribution switch, between the distribution switch and the load block input line, proximate one of the load switches, and between the load switches and the loads.

2. The power management and distribution system of claim 1, wherein the distribution switch and the load switches are solid state switches.

3. The power management and distribution system of claim 1, further comprising a plurality of load blocks, each of the plurality of load blocks in operable communication with one another and with the at least one source block.

4. A power management and distribution system having a fault detection and isolation assembly comprising:
    at least one source block having a plurality of power distribution lines, wherein each of the plurality of power distribution lines includes a distribution switch and a source switch;
    a plurality of load blocks, each of the plurality of load blocks in operable communication with at least one of the plurality of power distribution lines and having a plurality of load block power input lines and output lines, wherein each of the plurality of load block power output lines includes a load switch;
    a plurality of loads carried power by at least one of the plurality of load block power output lines; and
    a protection logic unit comprising at least one algorithm for comparing a current differential to a current differential threshold at a plurality of locations, wherein the protection logic unit selectively determines which of the source switch, the distribution switches and the load switches are opened if the current differential exceeds the current differential threshold, wherein the plurality of locations comprises between the source switch and the distribution switch, between the distribution switch and the load block input line, proximate one of the load switches, and between the load switches and the loads.

5. The power management and distribution system of claim 4, wherein the distribution switches and source switches of the plurality of power distribution lines and the load switches are solid state switches.

6. A method of fault detection and isolation for a power management and distribution system comprising:
carrying power from a power source through a plurality of source switches to at least one source block;
carrying power from the at least one source block directly to a load block;
carrying power from the load block through at least one load switch to a load;
measuring a current at a plurality of locations along a power path and calculating a current differential between at least two of the plurality of locations, wherein the plurality of locations comprises between the plurality of source switches and a distribution switch, between the distribution switch and the load block input line, proximate one of the load switches, and between the load switches and the loads;
comparing the current differential to a current differential threshold; and
opening at least one of the plurality of source switches, the at least one distribution switch and the at least one load switch if the current differential exceeds the current differential threshold.

7. The method of claim 6, wherein the power characteristic is current.

8. The method of claim 7, wherein the plurality of locations comprises a power source output; proximate the plurality of source switches; a source block input; proximate the at least one distribution switch; a load block input; and proximate the at least one load switch.

9. The method of claim 8, further comprising:
summing a plurality of distribution switch and summed load block currents to determine a summed distribution switch current;
calculating a first current difference between a source block current and the summed distribution switch and summed load block currents; and
comparing the first current difference to a first current threshold.

10. The method of claim 9, further comprising:
summing a plurality of load switch currents to determine a summed load switch current;
calculating a second current difference between a load block current and the summed load switch current; and
comparing the second current difference to a second current threshold.

11. The method of claim 10, wherein calculating the first current difference is conducted over a time period of less than 20 milliseconds.

* * * * *